United States Patent Office

3,695,897
Patented Oct. 3, 1972

3,695,897
METHOD OF SEPARATING AND COLLECTING FLAVOR COMPONENTS CONTAINED IN FOODS
Kinji Uchida and Koya Mogi, both of 101 Myazaki, Noda, Japan, and Tamotsu Yokotsuka, 1–134 Edogawadai, Nagareyama, Japan
No Drawing. Filed Sept. 1, 1970, Ser. No. 68,787
Claims priority, application Japan, Sept. 1, 1969, 44/68,625
Int. Cl. A23l 1/22
U.S. Cl. 99—140 R    9 Claims

ABSTRACT OF THE DISCLOSURE

A method of separating and collecting food flavor components which comprises contacting liquid paraffin with a volatile food flavor components-containing starting material selected from the group consisting of gaseous and liquid materials to effect the absorption by said liquid paraffin of said flavor component, submitting the liquid paraffin, which has thus absorbed the flavor components, to ethanol vapor distillation under reduced pressure, and thereafter collecting the flavor components-containing ethanol that distills off.

---

This invention relates to a method of separating and collecting industrially advantageously on a commercial scale from starting materials containing food flavor components by a simple operation the complex and multifarious flavor constituent components contained therein without impairment of the natural equilibrium of the complex and multifarious character of the composition of these flavor components, the flavor components being obtained in form of an ethanol solution containing said flavor components at a high concentration. More specifically, the invention relates to a method of separating and collecting the volatile flavor components in foods which comprises contacting a starting material containing the volatile food flavor components, selected from the group consisting of the gaseous and liquid materials, with liquid paraffin to effect the absorption by said paraffin of the flavor components, submitting the liquid paraffin, which has absorbed the flavor components, to ethanol vapor distillation under reduced pressure and collecting the flavor components-containing ethanol that distills off.

The natural edible plants such as fruits, coffee, tea, both black and green, some varieties of vegetables and some varieties of nuts; and the fermentative foods such as soy sauce, miso (bean paste), sake, wine, fruit wine, vinegar, whiskey and brandy all possess characteristic flavors, but these natural flavors tend to become lost when these products are submitted to heating, concentration, decoloring and other processing treatments. This is especially so in the case of the dried foods which have become popular lately, a major portion of the flavor components of these products being eliminated along with the removal of the water from these foods. Hence, this has become a fatal defect of dried foods.

The flavor components of food and other natural products are made up of numerous complex flavor components, the combination of which and their quantitative proportion having an important bearing on the manifestation of their characteristic flavors. However, it is known that of the flavor components the low boiling components are especially subject to volatilization in processing these foods and natural products, with the consequence that serious effects are had on the quality of the flavor.

The usually practiced method of obtaining the flavor components is that wherein the flavor components are extracted with a low boiling solvent such, for example, as ether or petroleum ether, following which the solvent is evaporated from the extraction liquid to obtain the residual flavor components. However, in this method, not only is it impossible to remove the odor of the solvent completely, but also the composition and/or equilibrium of flavor components break down with the low boiling flavor components being evaporated along with the solvent. Hence, it is difficult to separate and collect the natural flavor components in a high quality state by this method.

In consequence of having furthered our researches with a view to overcoming these drawbacks, we found that by a procedure comprising first causing the absorption by liquid paraffin of the flavor components and then not submitting the flavor components-absorbed liquid paraffin to a liquid-liquid extraction with ethanol as usual but to distillation using ethanol vapor under reduced pressure conditions, i.e. to distillation under reduced pressure using ethanol vapor instead of the steam in steam distillation, it was possible to obtain the flavor components contained in the starting material in good yield with the use of a small amount of ethanol, in a state wherein the flavor components are in solution in ethanol at a high concentration and while being maintained in a state of equilibrium whereby their natural desirable flavors can be preserved.

We also found that by the usual liquid-liquid extraction procedure wherein ethanol is added to the liquid paraffin which has absorbed the flavor components and the flavor components are trans-solubilized into ethanol, the flavor components could not be transferred to the ethanol layer while maintaining the aforesaid state of equilibrium. It was further found that a part of the liquid paraffin was solubilized into the ethanol layer and also that since the extraction could not be carried out satisfactorily with the use of a small amount of ethanol, the ethanol solution containing the flavor components could only be obtained in low concentration. In addition, it was found that when attempts were made to concentrate this ethanol solution to provide it with a satisfactory concentration the low boiling flavor components would be evaporated off along with the ethanol and that a further worsening of the equilibrium of the flavor components could not be avoided.

As to why the flavor components cannot be readily extracted from the liquid paraffin in which they are absorbed while maintaining their state of equilibrium by which the desirable flavors can be preserved is presumed to be due to the diversity of the inherent distribution coefficients of the flavor components between the liquid paraffin layer and ethanol layer, and it is inferred that the difference between the distribution coefficients of those flavor components which are readily trans-solubilized into the ethanol layer and those flavor components which are relatively difficultly so trans-solubilized have a great effect.

Further, the invention method provides especially excellent results in extracting and separating the flavor components of the foods produced by the fermentation processes, it being found that the flavor components of the fermentative foods containing the largest possible amount of an inorganic salt, particularly NaCl, as typified by, say, the fermentative soy sauce, were especially desirable as materials to be treated by the invention method, since they readily migrate to the liquid paraffin layer by changes in the distribution coefficients ascribable to the presence of the inorganic salt.

Accordingly, an object of the present invention is to provide a method of separating and collecting from starting materials containing food flavor components by a simple as well as efficient operation the complex and multifarious flavor constituent components contained therein without impairment of the natural equilibrium by which the desirable flavors are manifested, the flavor components being obtained in the form of an ethanol solution containing said flavor components at a high concentration. Another object is to provide a method wherein the foregoing object is achieved and the effective separation and collection of the flavor components can be accomplished in the case of the flavor components of fermentative foods containing NaCl wherein the largest possible amount of NaCl is contained as typified by the fermentative soy sauce.

Other objects and advantages of the present invention will become apparent from the following description.

In the present invention it is important that the following combination of conditions be satisfied. The liquid paraffin which has been caused to absorb the flavor components in advance is with the prerequisite conditions submitted to ethanol vapor distillation under reduced pressure.

The objects of the invention cannot be attained by steam distillation or the usual ethanol extraction method by means of the liquid-liquid extraction technique.

In the first step of the invention method the starting material containing the volatile food flavor components selected from the gaseous and liquid materials is contacted with liquid paraffin and the flavor components are caused to be absorbed by the liquid paraffin (paraffin liquidum, liquid petroleum).

As the liquid paraffin, those from either the paraffinic or naphthenic source such as heavy liquid paraffin and light liquid paraffin (paraffin liquid level) can be used, for example, he liquid paraffins containing predominantly the hydrocarbons whose number of carbon atoms range on the order of 15–35 and usually include the hydrocarbons having molecular weights ranging on the order of 300–500. Conveniently used are those of boiling point exceeding 300° C., which have been well purified. Preferred is a liquid paraffin having a boiling point of above 300° C. and specific gravity of 0.828–0.905 (25° C.). A suitable stabilizer such as tocopherol may be incorporated. The viscosity is conveniently lower from the standpoint of operations.

As the starting food flavor components-containing materials, utilizable are those starting food flavor components-containing materials derived from natural products such, for example, as fresh fruit juices; coffee extract; black and green tea extracts; aqueous extracts or expressed juices of aromatic vegetables such as lettuce and parsley; and extracts or expressed juices of aromatic nuts such as almond. However, as especially preferred food flavor components-containing materials, mention can be made of those resulting from fermentation processes such, for example, as soy sauce; aqueous extracts of miso; Japanese sake or the aromatic gas which evolves during its fermentation; wine or the aromatic gas which evolves during fermentation of same; fruit wines or the aromatic gas which evolves during their fermenation; and brandy and whiskey.

Particularly excellent results are had when the invention process is applied to the extraction and separation of the flavor components from starting materials containing flavor components of foods obtained by the fermentation process, which contain the largest possible amount of common salt, as typified by fermentative soy sauce. Usually, those containing the largest possible amount of salt on the order ranging between 7–8 grams and 24–25 grams per 100 ml. of the fermentation liquid are preferred. If desired, a starting material containing substantially no common salt can be used by adding the salt.

While, as hereinabove indicated, a gaseous or liquid starting material derived from foods containing natural or artificial flavors is used in the invention, a starting material containing some solids may also be used provided that the separation of the liquid paraffin after having been contacted with such a starting material is not made substantially impossible.

As previously noted, the means per se of contacting the liquid paraffin with the starting food flavor components-containing material can be varied. In short, any means by which a fully intimate contact between the two can be had and in which the liquid paraffin can fully absorb the desired flavor components can be adopted.

In the case of a liquid material the two can be mixed with stirring, mixed and contacted by a spraying technique, flowably mixed while setting up a turbulent condition in a coiled pipe, mixed by rotatively flowing down films of the materials, or various other means of contact of the batch or continuous type of liquid-liquid contact methods can be utilized. On the other hand, in the case of gaseous materials, the mixing of the material can be accomplished by introducing it into the liquid paraffin and bubbling it therein, or it can be carried out while setting up a turbulent countercurrent or co-current state, or various other means of batch or continuous types of gas-liquid contact methods can be employed.

While the contact temperature is suitably varied in accordance with the volatility of the flavor components of the starting material, the contact means employed, and as to whether the material is liquid or gaseous, the operation is best carried out under mildest possible conditions ranging from a low temperature, one at which the liquid paraffin can still substantially maintain its liquid state, say, $-15$ to $-5°$ C., a temperature on the order of 80° C. Usually, room temperature is employed, but a temperature on the order of $+5°$ C. to 60° C. is frequently used.

The proportion in which the liquid paraffin is used varies depending upon such as the class of the starting material and method of contact, but in the case of the batch method a proportion of the paraffin to the starting material of about 5–30% (v./v.) per pass is preferred. The extraction may be repeated two or more times for enhancing the rate of extraction of the flavor components.

The extraction time imposed no particular restrictions, and a time of contact by which the desired flavor components can be fully absorbed by the liquid paraffin will suffice. For example, frequently used is a period of time ranging between several tens of seconds and several hours.

Again, it is generally an advantage to avoid contact with air in order to prevent the oxidative degradation of the food. For this purpose, useable are such inert gases as nitrogen, argon and carbon dioxide.

The liquid paraffin which has thus absorbed the flavor components is separated from the starting material. In the case of a gaseous starting material, the separation takes place spontaneously during the absorption step. On the other hand, in the case of a liquid starting material the liquid paraffin which has absorbed the flavor components can be separated and obtained by resorting to a suitable liquid-liquid phase separation operation. For accomplishing this separation completely in a short period of time, usually preferred is the use of centrifugation, but the separation of the liquid paraffin from the starting material may also be carried out by allowing the mixture to stand in those cases where there is no fear of degradation or decay of the starting material during the period the mixture is left standing.

In the invention method, the liquid paraffin in which has been absorbed the flavor components, as hereinbefore described, is submitted to ethanol vapor distillation under reduced pressure.

This operation is carried out in the following manner. The liquid paraffin in which has been absorbed the flavor constituents is placed in a still, and ethanol vapor, which has been generated in, say, an evaporator, is introduced into the paraffin thereby distilling off the flavor components along with the ethanol vapor.

The still is usually conveniently provided with a heating apparatus by which the distillation system can be heated to a suitable temperature or control thereof can be had.

The ethanol vapor to be introduced into the system may contain other gases or vapors to an extent that no interference takes place in the distillation of the flavor components along with the ethanol vapor or collection thereof in the trap. As such a gas or vapor, mention can be made of air, nitrogen, carbon dioxide and minor amounts of steam.

While the temperature and pressure of the distillation system is controlled to a point that the condensation of the ethanol vapor will not take place and also varies depending upon the flavor components contained in the starting material, a lowest possible temperature is preferably used so long as the distillation efficiency does not drop so much as to cause a marked increase in the actual operations time, since constituents which are relatively unstable to heat are contained in the flavor constituent components. Reduced pressure conditions of an order as will not cause the condensation of the ethanol vapor can then be used in accordance with the temperature chosen.

For example, in the case of the flavor components of soy sauce and wine, preferably raised are temperature conditions in which the final distillation temperature is below 80° C., and preferably below 60° C., and reduced pressure conditions in which the final pressure is on the order of 1–0.1 mm. Hg. In general, a temperature ranging between a temperature short of the boiling point of liquid paraffin and 0° C., and preferably 100°–5° C., and reduced pressure conditions ranging between a pressure short of normal atmospheric pressure and 0.05 mm. Hg, and preferably 500–0.1 mm. Hg, may be used.

In the other hand, the amount in which the ethanol vapor is fed is suitably adjusted in accordance with the temperature and pressure of the distillation operation. At a reduced pressure, the flavor components in the liquid paraffin can be practically all vaporized and recovered with a substantially very small quantity of ethanol, with the consequence that the flavor components can be obtained as an ethanol solution of high concentration.

The amount of ethanol will be sufficient, say, at an amount of less than 1% by volume, and usually less than 2% by volume, of the liquid paraffin, the flavor components being efficiently recovered therein. The flavor components can thus be obtained at a 100-fold concentration based on the liquid paraffin. However, in the case of a liquid-liquid extraction procedure, the use of 1–2% by volume of ethanol (absolute) would result in the ethanol being dissolved in the liquid paraffin, and hence the intended extraction could not be achieved. If 95% hydrous ethanol is used, even 1% by volume of ethanol based on the liquid paraffin would not become dissolved even though, say, a liquid-liquid extraction procedure is used, but, after the liquid-liquid mixing, the ethanol would become dispersed uniformly throughout the liquid paraffin and separation would become difficult. This is especially true in the case of the flavor components-containing liquid paraffin which has been contacted with a food material, the separation being poor even when the amount of ethanol used has been 2% by volume. The amount of ethanol must be at least 10% by volume of the liquid paraffin for the separation of the formed ethanol layer to be operationally feasible by the liquid-liquid extraction procedure. Even then in actual operations a centrifugation operation must be additionally performed.

The flavor components which vaporize along with the ethanol vapor as a result of the ethanol vapor distillation under reduced pressure are conducted to a condenser equipped with, say, a trap where they are collected upon condensation by cooling.

By continuing the distillation by continuously or intermittently raising either the degree of reduced pressure or distillation temperature, or both, gradually until the final degree of reduced pressure and/or final temperature are reached, all the volatile flavor components are distilled off in order starting from the low boiling components, and thus the collection of a broad range of volatile flavor components in the trap is made possible.

In condensation, since the flavor components conducted to the low temperature trap along with the ethanol vapor condensed simultaneously with the ethanol, the flavor components are collected directly as an ethanol solution and thus practically none of the components escape. Hence, the low boiling components which would be difficult to collect by the usual methods can be collected even under a considerably reduced pressure at very good yield as compared with the instance where they are collected separately. However, for completely collecting the flavor containing flavor components whose volatilities differ greatly, the loss of the low boiling constituents, which have been collected in the trap during the initial stages of the distillation, by re-volatilizing at lower pressure must be prevented. For this purpose it is preferred to divide the distillation operation into two or more steps and carrying out the collection with exclusive traps for each step. Alternatively, the flavor constituent components can be divided into two or more flavor classes and separately collected by controlling the distillation conditions. It also is an advantage to combine these procedures suitably.

Thus, by employment of the ethanol vapor distillation under reduced pressure not only is it possible to recover the flavor components absorbed by the liquid paraffin in a more efficient manner than in the case of the mere use of vacuum distillation, but also the recovery can be accomplished while preserving the desirable equilibrium of the flavor constituent components and particularly with no loss of the low boiling components. In addition, since the flavor components are obtained at a much higher concentration than in the case of the conventional methods, great advantages are had in utilizing these flavor components in the processing of foods and food flavors. An effect of this sort is not achievable by the known methods such as the simple evaporation method or steam distillation or the ethanol trans-solubilization method.

Thus, excellent results can be expected by the use of the invention method, its area of utilization covering a broad range which includes the case wherein submitting food to all such processing treatments (heating, concentration, drying, decoloring, etc.) in which flavor would be lost as, say, in the manufacture of dried foods, the flavor components are separated and collected in advance from the starting flavor component-containing food material and the separated flavor components are returned to the food after completion of its processing treatment; or the case where unnecessary flavors are to be removed from foods; or the case where flavor components alone are separated and collected from various materials having excellent flavors and the so collected flavors are added to foods optionally chosen or foods requiring the addition of flavors.

The following examples are given for illustrating several modes of practicing the invention method.

EXAMPLE 1

A 5-liter stoppered bottle is charged with 2 liters of soy sauce and 200 ml. of odorless pharmacopoeial liquid paraffin followed by displacing the air of upper layer with nitrogen. The two liquids are then commingled and contacted with each other by shaking the bottle vigorously for 30 minutes at room temperature, after which the bottle is allowed to stand, whereupon the contents separate into a top and a bottom layer. Since in each layer there remains admixed a slight amount of the other layer, this is completely removed by centrifugation. Thus, the liquid paraffin containing the flavor components and the soy sauce removed of its flavor (deflavored soy sauce) are each separated from each other with practically no quantitative loss. This deflavored soy sauce is completely devoid of foreign taste or odor, and its quality is not impaired at all aside from the fact that it contains no flavor components. Hence, the powdered soy sauce obtained by spray-drying of this deflavored soy sauce does not differ whatsoever from the usual spray-dried soy sauce and can be put to practical use.

On the other hand, the flavor components containing liquid paraffin (about 200 ml.) is placed in a 500-ml. flask for distillation use and heated at 50° C. on a hot water bath while introducing ethanol vapor from the bottom of the flask in small increments. At the same time, while sucking with a vacuum pump the vapor evolved is conducted from the top of the flask to the low temperature trap, which is cooled to the neighborhood of −70° C. with a Dry Ice-ethanol coolant. To ensure that the bubbling in the distillation flask does not become too violent, the ethanol vapor distillation is carried out while gradually increasing the degree of reduced pressure until the pressure inside the system becomes 0.3 mm. Hg an hour later. During this time 4.0 grams of ethanol vapor are used, and about 5.0 ml. of an ethanol solution containing soy sauce flavor components are obtained in the low temperature trap.

This ethanol solution has a strong soy sauce flavor. For example, if a small quantity of this is added to powdered soy sauce which is practically devoid of soy sauce flavor (one drop, i.e., about 0.02 ml. per 10 ml. of water-reconstituted soy sauce), it can be possible to reconstitute it into soy sauce having the quality of natural soy sauce.

EXAMPLE 2

Flavor components are extracted from 2 liters of soy sauce using 250 ml. of pharmacopoeial liquid paraffin and operating as in Example 1. The resulting liquid paraffin layer is contacted under identical conditions with 2 liters of fresh soy sauce to cause the migration of the flavor components therefrom to the liquid paraffin, following which the soy sauce is separated. After removing the minute quantity of soy sauce still remaining by centrifugation, the liquid paraffin is submitted to ethanol vapor distillation under reduced pressure, using an apparatus identical to that used in Example 1, equipped with low temperature traps arranged in parallel as a dual system. First, one trap only is used, and the degree of reduced pressure is gradually increased starting from normal pressure with the temperature of the distillation flask set at 50° C. When the pressure inside the system becomes 2.5 mm. Hg 20 minutes later, a change is made to the other trap. During this time, the amount of ethanol collected in the first trap is about 2 ml., and the flavor components contained are those of the relatively low boiling portion.

Next, the temperature of the distillation flask is raised to 60° C., and the pressure is gradually reduce to 0.2 mm. Hg starting from 2.5 mm. Hg. In about 20 minutes 2.0 ml. of ethanol are passed as vapor, and the distillation is completed. In the second trap, the relatively high boiling components are obtained as an ethanol solution in an amount of 2.0 ml. After combining two distillates and including the washings of the traps, a total of 5.0 ml. of a soy sauce flavor components-containing ethanol solution is obtained.

Control I

Five hundred ml. of a soy sauce flavor components-containing liquid paraffin, obtained as in Example 2, are divided into two portions. Instead of carrying out the ethanol vapor distillation under reduced pressure, the flavor components are recovered by means of a conventional method (liquid-liquid extraction method), and the results obtained are compared.

(A) Operating as in Example 2, 4 ml. of a flavor components-containing ethanol solution are obtained from 250 ml. of the soy sauce flavor components-containing liquid paraffin. This is designated liquid A (present invention).

(B) Twenty-five ml. (10%) of 95% ethanol are added to the other 250 ml. portion of the liquid paraffin, following which the mixture is shaken and thereafter centrifuged to separate the liquid into an upper and a lower layer. The upper ethanol layer obtained in an amount of about 20 ml., is concentrated to 4 ml. in a vacuum rotary evaporator at 40° C. This is designated liquid B (control).

The following test was carried out using the foregoing liquids A and B.

Sensory test

The soy sauce samples were prepared in the following manner.

To 100 ml. each of soy sauce obtained by dissolving in water the usual powdered soy sauce (spray-dried fermentative soy sauce) were added severally 0.2 ml. of liquids A and B.

A sensory test on the excellence of the flavor of these two samples was made by a panel of twenty-two members in accordance with the triangular method. As a result, liquids A and B were discriminable significantly at 1% level. Further, liquid A was preferred significantly at 1% level. Consequently, it can be seen that the invention method is far superior to the known ethanol liquid-liquid extraction method.

In carrying out the extraction of control experiment, the conditions of the liquid-liquid extraction method were chosen such as to ensure that the concentration of the flavor components would so far as feasible become the highest.

EXAMPLE 3

A stoppered 3-liter bottle is charged with 2 liters of white wine and 250 ml. of pharmacopoeial liquid paraffin, the air of the upper layer is displaced with nitrogen, and thereafter the bottle is shaken for 30 minutes at room temperature to achieve the thorough mixing and contact of the two liquids. This bottle is then allowed to stand, and the separated lower layer, the white wine layer, is removed. Two liters of fresh wine is further added to the bottle wherein remains the liquid paraffin, after which the bottle is similarly shaken again followed by allowing to stand, whereupon separation into two layers takes place. To ensure the perfect separation of the layers, each layer is centrifuged. About 250 ml. of flavor components-containing liquid paraffin and 4 liters of white wine are obtained. While this white wine was removed of its characteristic flavor, it was completely devoid of foreign taste or foreign odors. Also practically no loss of its alcohol component was noted.

The flavor components-containing liquid paraffin in an amount of 250 ml. is submitted to ethanol vapor distillation for 40 minutes at 40–50° C. using the apparatus identical to that used in Example 1 (final pressure 0.4 mm. Hg), and about 4.0 ml. of an ethanol solution containing white wine flavor components are obtained in the low temperature trap. This solution possesses a strong white wine aroma. When a minute amount of this ethanol solution was added to white wine of middle grade and not possessing good aroma (one drop, i.e., 0.02 ml. per 30 ml.), it was possible to transform this white wine into one having very high aroma.

EXAMPLE 4

250 grams of coffee powder obtained immediately after the coffee beans were roasted and ground are extracted in customary manner with 2 liters of hot water. This extraction liquid is contacted with 250 ml. of liquid paraffin in a stream of nitrogen, thereby absorbing in the liquid paraffin the flavor characteristic of coffee.

200 milliliters of this coffee flavor components-containing liquid paraffin are placed in a distillation flask identical to that used in Example 1 for carrying out the ethanol vapor distillation. The distillation under reduced pressure is then carried out by heating the flask at 60° C. and introducing ethanol vapor into the liquid paraffin from the bottom of the flask while adjusting the addition so as to prevent the bubbling inside the flask becoming too violent and in the meantime gradually raising the degreee of reduced pressure, the coffee flavor components being condensed and collected in the Dry Ice-cooled trap along with the ethanol. About 2 ml. of an ethanol solution richly containing the aroma characteristic of coffee immediately after roasting of the beans are obtained with a reduced pressure distillation time of 20 minutes and a maximum reduced pressure of 1.5 mm. Hg.

EXAMPLE 5

Two liters of grape juice are mixed and contacted with 125 ml. of liquid paraffin in a closed vessel, after which the two are separated. The fruit juice is then contacted with 125 ml. of another batch of liquid paraffin whereby the flavor components of the fruit juice are absorbed by the liquid paraffin. These two batches of liquid paraffin are combined and placed in an apparatus identical to that used in Example 1, in which the ethanol vapor distillation under reduced pressure is carried out by heating at 40° C. and gradually raising the degree of reduced pressure in the distillation flask while passing thereinto ethanol vapor in small increments. The distillation terminates 40 minutes later when the temperature inside the distillation flask reaches 70° C. and the pressure inside the system attains 0.5 mm. Hg. About 3 ml. of an ethanol solution richly containing the flavor characteristic of fruit juice are obtained in the low temperature trap.

On the other hand, the fruit juice remaining after having been extracted of its flavor components is centrifuged to completely remove the liquid paraffin which is present in the juice in a slight amount. The juice is then concentrated using a glass flask evaporator of the circulating type to obtain 400 ml. of concentrated juice. When 2.5 ml. of the flavor components-containing ethanol solution, obtained as hereinbefore described, are added to the foregoing concentrated juice, a concentrated juice which has a flavor considerably more like the natural juice than that obtained when the grape juice is directly concentrated, is obtained.

We claim:

1. A method of separating and collecting food flavor components which comprises contacting liquid paraffin with a volatile food flavor components-containing starting material selected from the group consisting of gaseous and liquid materials to effect the absorption by said liquid paraffin of said flavor component, submitting the liquid paraffin, which has thus absorbed the flavor components, to ethanol vapor distillation under reduced pressure, and thereafter collecting the flavor components containing ethanol that distills off.

2. The method according to claim 1 wherein said ethanol vapor distillation under reduced pressure is carried out at a temperature ranging between a temperature short of the boiling point of the liquid paraffin and 0° C. and a reduced pressure ranging between a pressure short of normal atmospheric pressure and 0.05 mm. Hg, and further under temperature and pressure conditions which do not cause condensation of the ethanol vapor inside the distillation system.

3. The method according to claim 2 wherein said temperature ranges between 100° and 5° C. and said reduced pressure ranges between a pressure short of normal atmospheric pressure and 0.1 mm. Hg.

4. The method according to claim 1 wherein said ethanol vapor distillation under reduced pressure is carried out under conditions which comprises continuously or intermittently raising the degree of reduced pressure and/or temperature from their initial levels until attainment of the final pressure and temperature.

5. The method according to claim 1 which is characterized in that said ethanol vapor distillation under reduced pressure is carried out in a plurality of steps.

6. The method according to claim 1 which comprises effecting the contact between said flavor components-containing starting material and liquid paraffin at a temperature ranging from 80° C. or below to the temperature at which said paraffin still maintains its liquid state.

7. The method according to claim 6 wherein said temperature ranges between 5° and 60° C.

8. The method according to claim 6 wherein said liquid paraffin is one having a boiling point of not less than 300° C. and a specific gravity of 0.828–0.905.

9. The method according to claim 1 wherein said food flavor components-containing starting material is selected from the group consisting of fermentative soy sauce, aqueous extract of fermentative miso and other flavor components-containing foods containing common salt and obtained by the fermentation process.

References Cited

UNITED STATES PATENTS 1,908,407    5/1933    Coupeau et al. _____ 99—46

OTHER REFERENCES

Moncrieff, "The Chemical Senses," Leonard Hill Limited, London (1944), pp. 317–318.

MORRIS O. WOLK, Primary Examiner

W. R. BOVEE, Assistant Examiner

U.S. Cl. X.R.

99—145, 71, 105

UNITED STATES PATENT OFFICE
CERTIFICATE OF CORRECTION

Patent No. 3,695,897            Dated October 3, 1972

Inventor(s) KINJI UCHIDA, KOYA MOGI and TAMOTSU YOKOTSUKA

It is certified that error appears in the above-identified patent and that said Letters Patent are hereby corrected as shown below:

In the heading insert:

Assignee: Kikkoman Shoyu Co., Ltd., Chiba-ken, Japan

Signed and sealed this 10th day of April 1973.

(SEAL)
Attest:

EDWARD M. FLETCHER, JR.
Attesting Officer

ROBERT GOTTSCHALK
Commissioner of Patents